United States Patent [19]

Yagi et al.

[11] Patent Number: 4,894,281

[45] Date of Patent: Jan. 16, 1990

[54] FIBER-REINFORCED POLYMER MOLDED BODY

[75] Inventors: Kazuo Yagi, Ohtake; Hitoshi Mantoku, Iwakuni, both of Japan

[73] Assignee: Mitsui Petrochemical Industries, Ltd., Tokyo, Japan

[21] Appl. No.: 199,956

[22] Filed: May 27, 1988

[30] Foreign Application Priority Data

May 29, 1987 [JP] Japan .................. 62-131396
May 29, 1987 [JP] Japan .................. 62-131397
Jun. 26, 1987 [JP] Japan .................. 62-157511

[51] Int. Cl.$^4$ ............... B32B 27/04; B32B 27/12; B32B 27/08; B32B 25/10
[52] U.S. Cl. ........................... 428/286; 428/284; 428/289; 428/290; 428/293; 428/364; 428/441; 428/486.1; 428/516; 428/517; 428/518; 428/520; 428/902; 428/911; 525/92
[58] Field of Search .............. 525/106; 428/911, 902

[56] References Cited

U.S. PATENT DOCUMENTS

| 4,035,550 | 7/1977 | Suh et al. ............... 525/106 |
| 4,457,985 | 7/1984 | Harpell et al. ......... 428/911 |
| 4,595,546 | 6/1986 | Wheeler, Jr. .......... 525/106 |
| 4,613,535 | 9/1986 | Harpell ................... 428/902 |

FOREIGN PATENT DOCUMENTS 229477 7/1987 European Pat. Off. .
62-257415 11/1987 Japan .

Primary Examiner—George F. Lesmes
Assistant Examiner—J. M. Gray
Attorney, Agent, or Firm—Sherman and Shalloway

[57] ABSTRACT

Disclosed is a fiber-reinforced polymer molded body which comprises a matrix of a polymer having a processing temperature lower than 220° C. and at least one reinforcing layer of a molecularly oriented and silane-crosslinked ultra-high-molecular-weight polyethylene fiber, which is laminated with or embedded in the matrix, wherein the reinforcing layer substantially retains the orientation crystal structure of the ultra-high-molecular-weight polyethylene fiber.

13 Claims, 4 Drawing Sheets

FIBER-REINFORCED POLYMER MOLDED BODY

BACKGROUND OF THE INVENTION (1) Field of the Invention

The present invention relates to a fiber-reinforced polymer molded body and a process for the preparation thereof.

More particularly, the present invention relates to a fiber-reinforced polymer molded body comprising a polymer matrix and a reinforcing layer of a molecularly oriented and silane-crosslinked ultra-high-molecular-weight polyethylene fiber laminated with or embedded in the polymer matrix, which has excellent mechanical characteristics such as high elastic modulus and high strength and excellent electric characteristics, and a process for the preparation of this molded body.

(2) Description of the Prior Art

Japanese patent application Laid-Open Specification No. 171951/83 discloses a composite structure comprising a network of a ultra-high-molecular-weight polyethylene fiber or polypropylene fiber and a matrix composed of a polymer having a polyethylene crystal region or polypropylene crystal region and having a melting point or sticking point lower by at least 3° C. than the melting point of the polyolefin fiber. It is taught that this composite structure has a practically measured strength higher than the theoretically estimated value of the strength and this increase of the strength in the composite structure may be due to a certain desirable action outweighing the loss of the crystallinity of the fiber caused at the molding step.

A drawn fiber of ultra-high-molecular-weight polyethylene has high elastic modulus and high tensile strength but it still retains an inherent defect of polyethylene, that is, a poor heat resistance.

It is known that the heat resistance of polyethylene is generally improved by molecular orientation or crosslinking of polyethylene. However, the improvement of the heat resistance in this conventional technique is limited, and it is impossible to overcome the inherent restriction of polyethylene, that is, a relatively low melting point of 110° to 140° C. So far as we know, when molded bodies of polyethylene are exposed to a temperature of 180° C. for 10 minutes, most of them are fused and the strength is lost.

Accordingly, a fiber-reinforced polymer composite structure formed by combining a polyolefin fiber with a polymer matrix at a temperature higher than the melting point of the polyolefin fiber, in which the polyolefin fiber is present while retaining the inherent orientation and crystallization state has not been known.

SUMMARY OF THE INVENTION

It is therefore a primary object of the present invention to provide a fiber-reinforced polymer molded body having a matrix of a polymer and a reinforcing layer of a polyolefin fiber laminated with or embedded in the polymer matrix, to which exceedingly high modulus and mechanical strength are imparted by this specific structure, and a process for the preparation thereof.

In accordance with the present invention, there is provided a fiber-reinforced polymer molded body which comprises a matrix of a polymer having a processing temperature lower than 220° C. and at least one reinforcing layer of a molecularly oriented and silane-crosslinked ultra-high-molecular-weight polyethylene fiber, which is laminated with or embedded in the matrix, wherein the reinforcing layer substantially retains the orientation crystal structure of the ultra-high-molecular-weight polyethylene fiber.

Furthermore, in accordance with the present invention, there is provided a process for the preparation of a fiber-reinforced polymer molded body, which comprises arranging a filament of a molecularly oriented and silane-crosslinked ultra-high-molecular-weight polyethylene or a non-woven fabric, woven fabric or knitted fabric composed of said filament in the plane direction and combining the filament or fabric with a polymer having a processing temperature lower than 220° C. in the state where the ends of the filament or fabric are restrained.

Incidentally, in the instant specification, if the polymer is a thermoplastic resin, the melting point or softening point of the resin corresponds to the processing temperature of the polymer, and if the polymer is a thermosetting resin, the setting temperature of the resin corresponds to the processing temperature of the polymer. If the polymer is a rubber, the curing temperature of the rubber corresponds to the processing temperature of the polymer.

Furthermore, in the instant specification, the melting point or softening point of the thermoplastic resin means the melting point in case of a thermoplastic resin having a melting point but means the softening point in case of a thermoplastic resin having no melting point.

DETAILED DESCRIPTION OF THE PREFERRED EMBODIMENTS

The present invention is based on the finding that if a molecularly oriented and silane-crosslinked ultra-high-molecular-weight polyethylene fiber is combined with a polymer having a processing temperature lower than 220° C. at this processing temperature under restraint conditions or if the obtained composite structure is further subjected to processing such as curing or setting, the orientation crystal structure of the above-mentioned fiber is substantially retained in the obtained composite structure.

The reinforcing fiber used in the present invention is prepared by shaping ultra-high-molecular-weight polyethylene grafted with a silane, drawing the shaped body and carrying out silane crosslinking. This drawn, crosslinked and shaped body has such a novel characteristic that at least a part of the polymer chain constituting the shaped body has a melting point highly improved under restraint conditions over the inherent melting point of the starting ultra-high-molecular-weight polyethylene. The restraint conditions referred to in the instant specification mean conditions where no positive tension is given to the fiber but both the ends are secured or the fiber is wound on other article such as a frame so that free deformation is inhibited.

More specifically, the molecularly oriented and silane-crosslinked body of ultra-high-molecular-weight polyethylene used in the present invention has, in general, such characteristics that when the measurement is conducted under restraint conditions by using a differential scanning calorimeter, the crosslinked body has at least two crystal melting peaks (Tp) at temperatures higher by at least 10° C. than the inherent crystal melting temperature (Tm) of the ultra-high-molecular-weight polyethylene determined as the main peak at the time of the second temperature elevation, the heat of fusion based on these crystal melting peaks (Tp) is at least 50% of the whole heat of fusion, and the sum of heat of fusion of high-temperature side peaks (Tp1) at temperatures in the range of from (Tm+35)° C. (Tm+120)° C. is at least 5% of the whole heat of fusion.

The melting point of a polymer is a temperature at which melting of a crystal in the polymer is caused and the melting point is generally measured as the endothermic peak temperature causing melting of the crystal by a differential scanning calorimeter. This endothermic peak temperature is constant in the same kind of polymer, and this endothermic peak temperature is hardly changed by a post treatment such as a drawing treatment or a crosslinking treatment, and even after a drawing heat treatment, which is known to give the largest change, the endothermic peak temperature merely shifts by about 15° C. at most to the high-temperature side.

Figure 1:
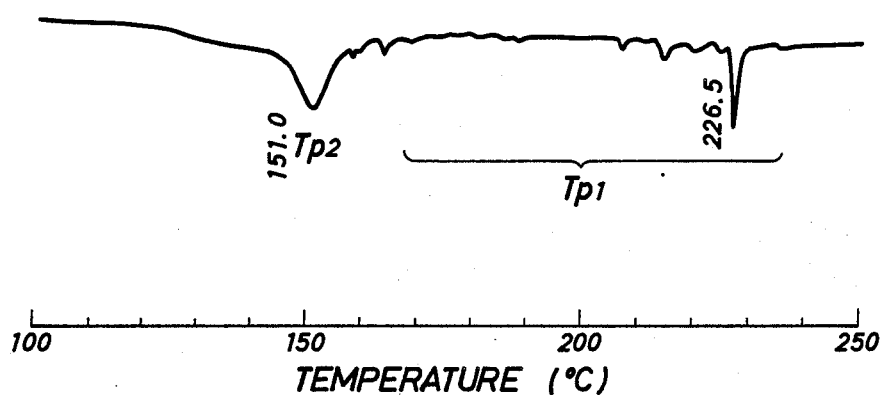
FIG. 1 shows an endothermic curve of a silane-crosslinked drawn ultra-high-molecular-weight polyethylene fiber prepared in Example 1 at the time of the first temperature elevation, determined under restraint conditions by a differential scanning calorimeter.
Figure 2:
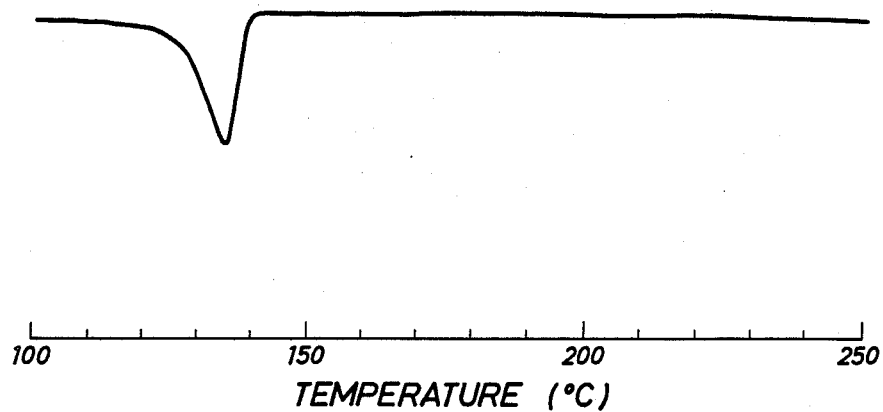
FIG. 2 is an endothermic curve of a press sheet having a thickness of 100 $\mu$, which is molded at 200° C. from a ultra-high-molecular-weight polyethylene powder used in Example 1, at the time of the first temperature elevation.
Figure 3:
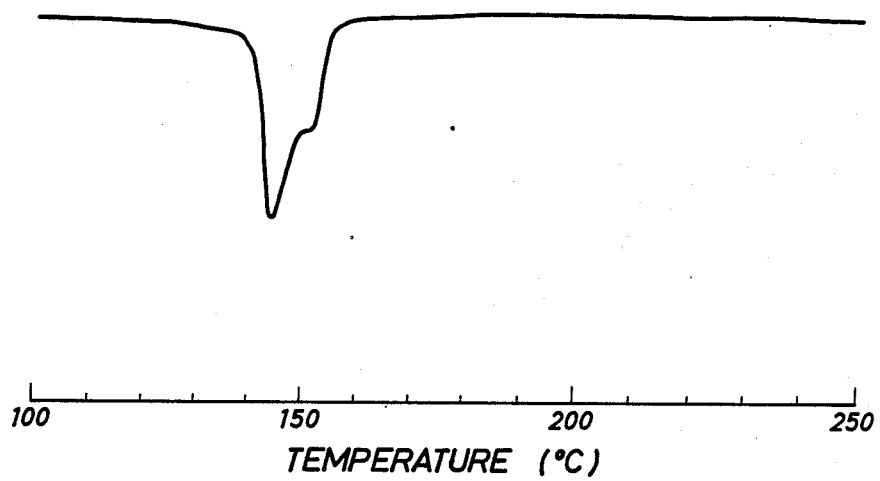
FIG. 3 is an endothermic curve of an ungrafted drawn ultra-high-molecular-weight polyethylene fiber prepared in Comparative Example 1 at the time of the first temperature elevation.
Figure 4:
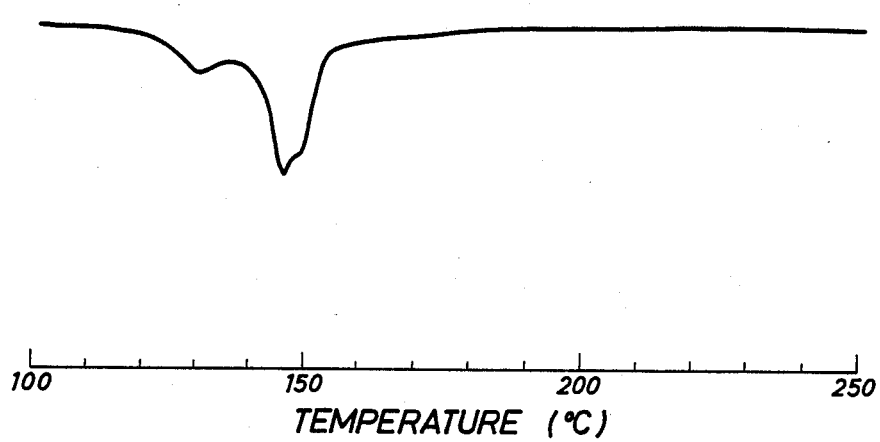
FIG. 4 is an endothermic curve, at the time of the first temperature elevation, of a sample obtained by extracting paraffin wax from an undrawn yarn silane-grafted in Example 1 with hexane at normal temperature, impregnating the undrawn yarn with dibutyl tin dilaurate and crosslinking the undrawn yarn in the same manner as described in Example 1.

FIG. 1 of the accompanying drawings is an endothermic curve of a molecularly oriented and silane-crosslinked filament (fiber) of ultra-high-molecular-weight polyethylene used in the present invention, as determined under restraint conditions by a differential scanning calorimeter, and FIG. 2 is an endothermic curve of the starting ultra-high-molecular-weight polyethylene, FIG. 3 is an endothermic curve of a drawn filament of the ultra-high-molecular-weight polyethylene shown in FIG. 2, as determined under restraint conditions and FIG. 4 is an endothermic curve of an undrawn silane-crosslinked filament of the ultra-high-molecular-weight polyethylene shown in FIG. 2, as determined under restraint conditions. Incidentally, the starting polyethylene and treatment conditions are described in the examples given hereinafter.

From these data, it is seen that a drawn or silane-crosslinked product of ultra-high-molecular-weight polyethylene has an endothermic peak by melting of the crystal at about 135° C., which is not substantially different from that of the untreated ultra-high-molecular-weight polyethylene and the peak area (heat of fusion) of the silane-crosslinked product is smaller than the peak area of the untreated polymer, whereas in the drawn, crosslinked fiber used in the present invention, a small peak is left at the position of the melting peak temperature of the untreated ultra-high-molecular-weight polyethylene and a large peak appears on the high-temperature side.

Figure 5:
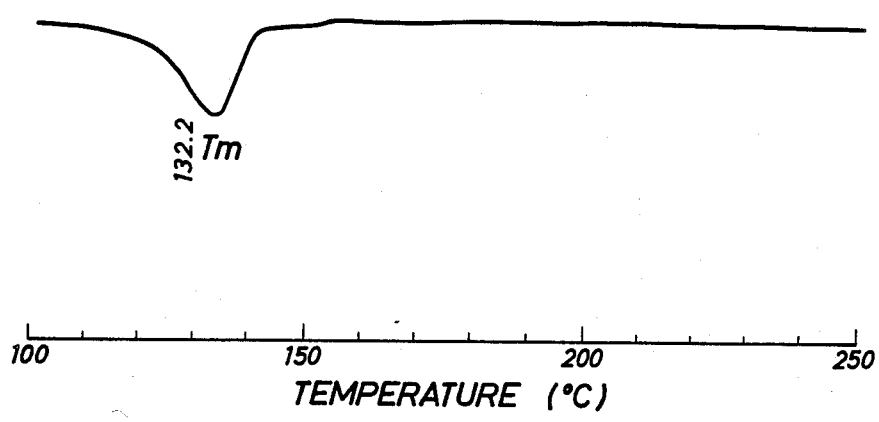
FIG. 5 is an endothermic curve of the silane-crosslinked drawn ultra-high-molecular-weight polyethylene fiber shown in FIG. 1 at the time of the second temperature elevation (second run).

FIG. 5 is an endothermic curve obtained when the sample shown in FIG. 1 is subjected to the second run (the second temperature elevation conducted after the measurement shown in FIG. 1). From the data shown in FIG. 5, it is seen that at the time of the second temperature elevation, the main peak by the melting of the crystal appears at the temperature substantially equal to the melting peak temperature of the untreated ultra-high-molecular-weight polyethylene, and the molecular orientation in the sample substantially disappears at the measurement shown in FIG. 5. Accordingly, it is understood that the shift of the endothermic peak of the sample to the high-temperature side in FIG. 1 has a close relation to the molecular orientation in the fiber.

The reason why the crystal melting temperature shifts to the high-temperature side in the oriented and crosslinked fiber used in the present invention has not been completely elucidated, but we consider as follows. When silane-grafted ultra-high-molecular-weight polyethylene is subjected to the drawing operation, the silane-grafted region is selectively made amorphous, and an oriented crystalline region is formed through this amorphous region. If this drawn fiber is then crosslinked in the presence of a silanol condensation catalyst, a crosslinked structure is selectively formed in the amorphous region and both the ends of the oriented crystalline region are fixed by silane crosslinking. In an ordinary drawn fiber, crystal melting is advanced from the amorphous portions at both the ends of the oriented crystalline region. In contrast, in the drawn and crosslinked fiber used in the present invention, the amorphous portions on both the ends of the oriented crystalline region are selectively crosslinked and the movement of the polymer chain is restricted, and therefore, it is considered that the melting temperature of the oriented crystalline region is improved.

In the molecularly oriented and silane-crosslinked fiber of ultra-high-molecular-weight polyethylene, not only the fiber state but also the oriented crystal state is maintained at a temperature higher than the inherent melting point of the polyethylene. If this fiber is laminated with or embedded in a polymer under restraint conditions, a fiber-reinforced polymer molded body excellent in mechanical properties such as tensile strength, flexural strength, modulus and impact resistance is obtained.

For example, if the above-mentioned fiber is laminated with or embedded in a melt of a thermoplastic resin such as an olefin resin, there can be obtained a fiber-reinforced resin molded body which is excellent in mechanical properties such as modulus, strength, impact resistance and creep resistance and has a light weight and excellent electric characteristics.

Moreover, when the above-mentioned fiber is laminated with or embedded in a monomer or prepolymer of a thermosetting polymer having a setting temperature lower than 220° C. under restraint conditions and setting is then effected, there can be obtained a fiber-reinforced polymer molded body excellent in mechanical properties such as tensile strength, flexural strength, modulus and impact resistance. Especially, according to this embodiment of the present invention, a fiber-reinforced polymer molded body can be obtained by using a thermosetting polymer having a setting temperature exceeding 150° C., though use of this thermosetting polymer is impossible in case of a conventional polyethylene fiber.

Still further, if the above-mentioned fiber is laminated with or embedded in an uncured rubber having a curing temperature lower than 220° C. under restraint conditions, there can be obtained a fiber-reinforced rubber molded body excellent in mechanical properties such as tensile strength, flexural strength, modulus and impact strength. Especially, according to this embodiment of the present invention, a fiber-reinforced rubber molded body can be obtained by using a rubber having a curing temperature exceeding 150° C., though use of this rubber is impossible in case of a conventional polyethylene fiber.

Fiber-Reinforced Polymer Molded Body

Figure 6:
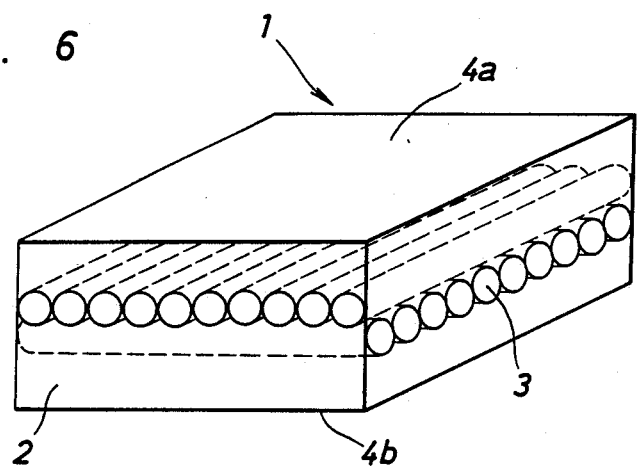
FIGS. 6 and 7 are schematic views of formed fiber-reinforced polymer molded bodies (the lamination numbers differ from those in the examples).
Figure 7:
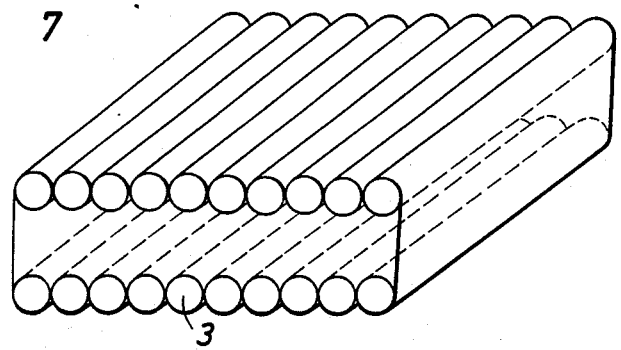

Referring to FIG. 6 illustrating an example of the fiber-reinforced polymer molded body of the present invention, this molded body 1 comprises a matrix 2 of a polymer having a processing temperature lower than 220° C. and a reinforcing layer 3 of a molecularly oriented and silane-crosslinked polyethylene fiber laminated with or embedded in the matrix 2. The reinforcing fiber layer 3 may have a single-layer structure or a multi-layer structure including at least two layers. In the specific example shown in FIG. 6, the reinforcing fiber layer 3 is completely embedded in the polymer matrix, and both the surfaces 4a and 4b of the molded body are composed substantially solely of the polymer. However, the reinforcing fiber layer 3 may be present on one or both of the surfaces 4a and 4b or in the vicinity thereof in the form laminated integrally with the polymer matrix, as shown in FIG. 7.

In the fiber-reinforced polymer molded body of the present invention, the silane-crosslinked ultra-high-molecular-weight polyethylene fiber constituting the reinforcing fiber layer 3 substantially retains the oriented crystal structure thereof. This reinforcing layer 3 is embedded or laminated over the entire surface of the molded body and is composed of a filament or tape of silane-crosslinked ultra-high-molecular-weight polyethylene molecularly oriented in at least one axial direction of the molded body 1, or a non-woven fabric, woven fabric or knitted fabric formed of this filament.

The ratio between the reinforcing fiber layer and the polymer matrix considerably changes according to the intended use or the thickness. However, it is generally preferred that the reinforcing fiber layer occupies 20 to 80%, especially 40 to 70%, of the entire volume of the molded body.

If the volume ratio of the reinforcing fiber layer 3 is below the above-mentioned range, the improvement of tensile strength, flexural strength, modulus, impact resistance and creep resistance by the fiber is insufficient. If the volume ratio of the reinforcing fiber layer exceeds the above-mentioned range, formation of an integrated fiber-reinforced polymer molded body becomes difficult.

Reinforcing Layer

The molecularly oriented and silane-crosslinked ultra-high-molecular-weight polyethylene fiber used in the present invention is prepared by heat-molding a composition comprising ultra-high-molecular-weight polyethylene having an intrinsic viscosity $[\eta]$ of at least 5 dl/g, a silane compound, a radical initiator and a diluent, drawing the molded body of the silane compound-grafted ultra-high-molecular-weight polyethylene, impregnating the drawn molded body with a silanol condensation catalyst during or after the drawing operation, and bringing the drawn molded body into contact with water to effect crosslinking.

The ultra-high-molecular-weight polyethylene means an ethylene polymer having an intrinsic viscosity $[\eta]$ of at least 5 dl/g, preferably 7 to 30 dl/g, as measured at 135° C. in decalin as the solvent.

Namely, of ethylene polymers obtained by so-called Ziegler polymerization of ethylene or ethylene and a small amount of other $\alpha$-olefin such as propylene, 1-butene, 4-methyl-1-pentene or 1-hexene, a polymer having a much higher molecular weight is meant by the ultra-high-molecular-weight polyethylene.

Any of silane compounds capable of grafting and cross-linking can be used as the silane compound for the grafting treatment. Such silane compounds have a radical-polymerizable organic group and a hydrolyzable organic group and are represented by the following general formula,

$$R_n SiY_{4-n} \qquad (1)$$

wherein R stands for a radical-polymerizable organic group containing an ethylenic unsaturation, Y stands for a hydrolyzable organic group, and n is a number of 1 or 2.

As the radical-polymerizable organic group, there can be mentioned ethylenically unsaturated hydrocarbon groups such as a vinyl group, an allyl group, a butenyl group and a cyclohexenyl group, and alkyl groups having an ethylenically unsaturated carboxylic acid ester unit, such as an acryloxyalkyl group and a methacryloxyalkyl group, a vinyl group is preferred.

As preferred examples of the silane compound, there can be mentioned vinyltriethoxysilane, vinyltrimethoxysilane and vinyltris(methoxyethoxy)silane, though silane compounds that can be used are not limited to those exemplified above.

At first, a composition comprising the above-mentioned ultra-high-molecular-weight polyethylene, the above-mentioned silane compound, a radical initiator and a diluent is heat-molded by melt extrusion or the like to effect silane grafting and molding. Namely, grafting of the silane compound to the ultra-high-molecular-weight polyethylene by radicals is caused.

All of the radical initiators customarily used for the grafting treatment of this type can be used as the radical initiator. For example, there can be mentioned organic peroxides, organic peresters, azobisisobutyronitrile and dimethyl azoisobutyrate. In order to effect grafting under melt-kneading conditions of ultra-high-molecular-weight polyethylene, it is preferred that the half-life period temperature of the radical initiator be in the range of from 100° to 200° C.

In order to make melt-molding of the silane-grafting ultra-high-molecular-weight polyethylene possible, a diluent is incorporated together with the above-mentioned components. A solvent for the ultra-high-molecular-weight polyethylene or a wax having a compatibility with the ultra-high-molecular-weight polyethylene is used as the diluent.

It is preferred that the silane compound be incorporated in an amount of 0.1 to 10 parts by weight, especially 0.2 to 5 parts by weight, the radical initiator is used in a catalytic amount, generally 0.01 to 3.0 parts by weight, especially 0.05 to 0.5 part by weight, and the diluent be used in an amount of 9900 to 33 parts by weight, especially 1900 to 100 parts by weight, per 100 parts by weight of the ultra-high-molecular-weight polyethylene.

It is preferred that melt kneading be carried out at a temperature of 150° to 300° C., especially 170° to 270° C. Mixing can be accomplished by a dry blending method using a Henschel mixer or a V-type blender or the melt-mixing method using a monoaxial or multi-axial extruder.

The molten mixture is extruded through a spinneret and molded in the form of a filament. In this case, the melt extruded from the spinneret can be subjected to drafting, that is, pulling elongation in the molten state. The draft ratio can be defined by the following formula:

$$\text{Draft ratio} = V/V_o \quad (2)$$

wherein $V_o$ stands for the extrusion speed of the molten polymer in a die orifice and $V$ stands for the speed of winding the cooled and solidified, undrawn extrudate.

The draft ratio is changed according to the temperature of the mixture and the molecular weight of the ultra-high-molecular-weight polyethylene, but the draft ratio is generally adjusted to at least 3, preferably at least 6.

The so-obtained undrawn filament is then subjected to the drawing treatment. It is generally preferred that drawing of the silane-grafted polyethylene filament be carried out at 40° to 160° C., especially 80° to 145° C. Air, steam or liquid medium can be used as the heat medium for heating and maintaining the undrawn filament at the above-mentioned temperature. However, if the drawing operation is carried out by using, as the heat medium, a solvent capable of dissolving out and removing the above-mentioned diluent, which has a boiling point higher than the melting point of the molded body-forming composition, such as decalin, decane or kerosine, the above-mentioned diluent can be removed, and at the drawing step, uneven drawing can be obviated and high-draw-ratio drawing becomes possible.

The drawing operation can be carried out in one stage or in two or more stages. The draw ratio depends on the desired molecular orientation, but satisfactory results are generally obtained if the drawing operation is carried out at a draw ratio of 5 to 80, especially 10 to 50.

During or after the above-mentioned drawing operation, the molded body is impregnated with a silanol condensation catalyst, and the drawn molded body is brought into contact with water to effect crosslinking.

Known silanol condensation catalysts, for example, dialkyl tin dicarboxylates such as dibutyl tin dilaurate, dibutyl tin diacetate and dibutyl tin dioctoate, organic titanates such as tetrabutyl titanate, and lead naphthenate can be used as the silanol condensation catalyst. The silanol condensation catalyst in the state dissolved in a liquid medium is brought into contact with the undrawn or drawn molded body, whereby the molded body is effectively impregnated with the silanol condensation catalyst. For example, in the case where the drawing treatment is carried out in a liquid medium, if the silanol condensation catalyst is dissolved in the drawing liquid medium, the impregnation of the molded body with the silanon condensation catalyst can be accomplished simultaneously with the drawing operation.

The molded body may be impregnated with a so-called catalytic amount of the silanol condensation catalyst, and although it is difficult to directly define the amount of the silanol condensation catalyst, if the silanol condensation catalyst is incorporated in an amount of 10 to 100% by weight, especially 25 to 75% by weight, into the liquid medium to be contacted with the undrawn or drawn molded body and the filament is brought into contact with this liquid medium, satisfactory results can be obtained.

The crosslinking treatment of the drawn molded body is accomplished by bringing the silanol condensation catalyst-impregnated silane-grafted ultra-high-molecular-weight polyethylene drawn molded body into contact with water. For the crosslinking treatment, it is preferred that the drawn molded body be contacted with water at a temperature of 50° to 130° C. for 3 to 24 hours. For this purpose, it is preferred that water be applied to the drawn molded body in the form of hot water or hot water vapor. At this crosslinking treatment, moderation of orientation can be prevented by placing the drawn molded body under restraint conditions, or the drawn molded body may be placed under non-restraint conditions so that orientation can be moderated to some extent.

If the drawn molded body is crosslinked and is then subjected to a drawing treatment (the draw ratio is ordinarily lower than 3), the mechanical strength such as tensile strength can be further improved.

The molecularly oriented and silane-crosslinked ultra-high-molecular-weight polyethylene fiber used in the present invention has such surprising characteristics that under restraint conditions, the polyethylene fiber has crystal melting peaks (Tp) even at temperatures much higher than the inherent crystal melting temperature (Tm) of the ultra-high-molecular-weight polyethylene.

The inherent crystal melting temperature (Tm) of ultra-high-molecular-weight polyethylene can be determined by the so-called second run by a differential scanning calorimeter, that is, a method in which the fiber is once completely molten and then cooled to completely relax the molecular orientation, and the temperature is elevated again.

As is apparent from the above-mentioned FIG. 1, the filament used in the present invention is characterized in that the filament has at least two crystal melting peaks (Tp) at temperatures higher by at least 10° C. than the inherent crystal melting point (Tm) of the ultra-high-molecular-weight polyethylene, and the heat of fusion based on these crystal melting peaks (Tp) is at least 40%, especially at least 60%, of the total heat of fusion.

In general, the crystal melting peaks (Tp) in the fiber used in the present invention often appear as the high-temperature side peak (Tp1) in the temperature range of from (Tm+35)° C. to (Tm+120)° C. and the low-temperature side peak (Tp2) in the range of from (Tm+10)° C. to (Tm+35)° C., and the peak at Tm is extremely small.

In the case where the amount of the grafted silane in the molded body is small, it often happens that the high-temperature side crystal melting zone (as shown by Tp1) does not appear as a definite maximum point (peak) in the endothermic curve but appears as a broad maximum point or as a shoulder or tail on the high temperature side of the low-temperature side crystal melting zone (as shown by Tp2) over the range of from (Tm+35)° C. to (Tm+120)° C.

In the case where the melting peak at Tm is extremely small, it sometimes happens that the peak is hidden by the shoulder of the melting peak Tp1. Even if the melting peak Tm is not confirmed, the function or performance of the ultra-high-molecular-weight polyethylene filament is not hindered at all. Incidentally, the high-temperature side peak (Tp1) in the range of from (Tm+35)° C. to (Tm+120)° C. and the low-temperature side melting peak (Tp2) in the range of from (Tm+10)° C. to (Tm+35)° C. are sometimes further divided into at least two melting peaks, respectively, according to the sample-measuring conditions and the melting point-measuring conditions.

These high crystal melting peaks (Tp1 and Tp2) exert a function of highly improving the heat resistance of the ultlra-high-molecular-weight polyethylene filament, but it is construed that it is the high-temperature side melting peak (Tp1) that makes a contribution to the improvement of the strength heat retention ratio after the heat history at a high temperature.

Accordingly, it is preferred that the sum of the heat of fusion based on the high-temperature side melting peak (Tp1) in the range of from (Tm+35)° C. to (Tm+120)° C. be at least 5%, especially at least 10%, based on the total heat of fusion.

So far as the sum of the heat of fusion based on the high-temperature side melting peak (Tp1) satisfies the above-mentioned requirement, even if the high-temperature side peak (Tp1) does not appear as a definite peak but appears as an assembly of small peaks or a broad peak, the creep resistance characteristic is still maintained at a high level, though the heat resistance is sometimes degraded to some extent.

The degree of the molecular orientation in the molded body can be determined according to the X-ray diffractometry, the birefringence method, the fluorescence polarization method or the like. In view of the heat resistance and mechanical properties, it is preferred that the drawn silane-crosslinked filament used in the present invention be molecularly oriented to such an extent that the orientation degree by the half-value width, described in detail in Yukichi Go and Kiichiro Kubo, Kogyo Kagaku Zasshi, 39, page 992 (1939), that is, the orientation degree (F) defined by the following formula:

$$\text{Orientation degree } F = \frac{90° - H°/2}{90°}$$

wherein H° stands for the half-value width (°) of the intensity distribution curve along the Debye ring of the intensest paratrope plane on the equator line, is at least 0.90, especially at least 0.95.

The amount of the grafted silane can be determined by subjecting the drawn crosslinked molded body to an extraction treatment in p-xylene at a temperature of 135° C. for 4 hours to remove the unreacted silane or the contained diluent and measuring the amount of Si by the weight method or the atomic-absorption spectroscopy. In view of the heat resistance, it is preferred that the amount of the grafted silane in the fiber used in the present invention be 0.01 to 5% by weight, especially 0.035 to 3.5% by weight, as Si. If the amount of the grafted silane is below the above-mentioned range, the crosslinking density is lower than that specified in the present invention and if the amount of the grafted silane exceeds the above-mentioned range, the crystallinity is reduced, and in each case, the heat resistance becomes insufficient.

In the molecular oriented and silane-crosslinked fiber used in the present invention, the crystal melting temperature of at least a part of the polymer chain constituting the fiber is greatly shifted to the high-temperature side as stated hereinbefore, and therefore, the heat resistance is highly improved. Namely, the fiber used in the present invention has such a surprising heat resistance, not expected from conventional ultra-high-molecular-weight polyethylene, that the strength retention ratio after 10 minutes' heat history at 160° C. is at least 80%, preferably after 10 minutes' heat history at 180° C. the heat retention ratio is at least 60%, especially at least 80%, and the strength retention ratio after 5 minutes' heat history at 200° C. is at least 80%.

The filament used in the present invention is excellent in the heat creep resistance. For example, under conditions of a load corresponding to 30% of the breaking load and a temperature of 70° C., the filament used in the present invention has an elongation lower than 30%, especially lower than 20%, after 1 minute's standing, while the uncrosslinked filament shows an elongation more than 50% after 1 minute's standing under the same conditions.

Furthermore, the filament used in the present invention shows an elongation lower than 20% after 1 minute's standing under conditions of a load corresponding to 50% of the breaking load and a temperature of 70° C., while the uncrosslinked filament is elongated and broken within 1 minute under the same conditions.

Since this molded body contains the grafted and crosslinked silane, the molded body is excellent in the adhesiveness, especially the adhesiveness to various resins. This fact will be readily understood from the examples given hereinafter.

Moreover, since this filament is composed of ultra-high-molecular-weight polyethylene and is molecularly oriented effectively, the filament is excellent in the mechanical characteristics. For example, this filament in the form of a drawn filament has a modulus of at lesat 20 GPa and a tensile strength of at least 1.2 GPa.

The single filament denier of the molecularly oriented and silane-crosslinked filament used in the present invention is not particularly critical, but in view of the strength, it is generally preferred that the fineness of the filament be 0.5 to 20 denier, especially 1 to 10 denier.

The filament is generally used in the form of a multi-filament yarn, a multi-filament doubled and twisted yarn or a non-woven fabric, woven fabric or knitted fabric composed thereof as the reinforcing fiber layer for the polymer.

Polymer Matrix (i) Thermoplastic polymer

The thermoplastic polymer used as the matrix in the present invention should have a melting point or softening point lower than 220° C. If the melting point or softening point exceeds 220° C., the molecularly oriented and silane-crosslinked ultra-high-molecular-weight polyethylene fiber included in the fiber-reinforced polymer molded body substantially loses the orientation crystal structure. It is preferred that the thermoplastic polymer for the matrix should have a melting point or softening point of 100° to 200° C., especially 150° to 180° C.

As preferred examples of the matrix polymer, there can be mentioned crystalline olefin homopolymers and copolymers such as low-density polyethylene, medium-density polyethylene, high-density polyethylene, linear low-density polyethylene, polypropylene, a crystalline propylene/ethylene copolymer, a propylene/butene-1 copolymer, an ethylene/butene-1 copolymer and an ethylene/propylene/butene-1 copolymer, olefinic elastomers such as an ethylene/propylene copolymer rubber and copolymers of α-olefins such as ethylene with conjugated dienes such as butadiene or non-conjugated dienenes such as ethylidene norbornene and dicyclopentadiene, e.g., an ethylene/propylene/non-conjugated diene copolymer rubber, and copolymers of olefins with other ethylenically unsaturated monomers, such as an ethylene/vinyl acetate copolymer, an ethylene/ethyl acrylate copolymer, an ethylene/vinyl alcohol copolymer, an ethylene/vinyl chloride copolymer and an ion-crosslinked olefin copolymer. These olefinic matrix copolymers are especially excellent in the heat adhesiveness to the reinforcing fiber layer.

For the production of the fiber-reinforced polymer molded body, it is preferred that melt flow rate of the polymer as determined according to (ASTM D 1238) be at least 1 g/10 min, especially at least 5 g/10 min.

Thermoplastic polymers that can be used in the present invention are not limited to those exemplified above, and other polymers can be used if the melting point or softening point is within the above-mentioned range. For example, there can be mentioned styrene resins such as polystyrene, a styrene/acrylonitrile copolymer, a styrene/butadiene copolymer and an ABS resin, chlorine-containing polymers such as a soft vinyl chloride resin, a vinylidene chloride/acrylic copolymer, a vinylidene chloride/vinyl chloride copolymer, chlorinated polyethylene and a chlorinated vinyl resin, acrylic polymers such as polymethyl methacrylate and a methyl methacrylate/ethyl acrylate copolymer, low-melting-point polyamides such as nylon 11, nylon 12 and a nylon 6/nylon 66 copolymer, and low-melting-point or low-softening-point polyesters such as an ethylene terephthalate/isophthalate copolyester and an ethylene/butylene terephthalate copolyester.

At least one of known additives such as lubricants, mold release agents, antioxidants, softeners, plasticizers, fillers, colorants, foaming agents and crosslinking agents can be added to the thermoplastic polymer used as the matrix in the present invention according to the known recipe.

(ii) Thermosetting polymer

The thermosetting polymer used for the matrix in the present invention should be such that the setting temperature of a monomer or prepolymer is lower than 220° C. If the setting temperature exceeds 220° C., the molecularly oriented and silane-crosslinked ultra-high-molecular-weight polyethylene fiber built in the fiber-reinforced polymer molded body substantially loses the orientation crystal structure. It is preferred that the setting temperature of the thermosetting polymer for the matrix be 100° to 200° C., especially 150° to 180° C.

As preferred examples of the thermosetting polymer for the matrix, there can be mentioned a phenolic resin, a furan resin, a xylene formaldehyde resin, a ketone formaldehyde resin, a urea resin, a melamine resin, an aniline resin, an alkyd resin, an unsaturated polyester resin, a diallyl phthalate resin, an epoxy resin, a triallyl cyanurate resin, a triazine resin, a polyurethane resin and a silicone resin.

An epoxy resin is one of preferred thermosetting resins. As the epoxy resin, there can be mentioned heterocyclic ring-containing epoxy resins such as a bisphenol A type epoxy resin, a bisphenol F type epoxy resin, a phenol novolak epoxy resin, a cresol novolak epoxy resin, an alicyclic epoxy resin, triglycidyl isocyanurate and hydantoin epoxy, aliphatic epoxy resins such as a hydrogenated bisphenol A type epoxy resin, propylene glycol diglycidyl ether and pentaerythritol polyglycidyl ether, and an epoxy resin obtained by reaction of an aliphatic or aromatic carboxylic acid with epichlorohydrin, a spiro ring-containing epoxy resin, a glycidyl ether type epoxy resin obtained by reaction of an o-allylphenol novolak compound with epichlorohydrin and a glycidyl ether type epoxy resin obtained by reaction of a diallyl bisphenol compound having allyl groups at the o-positions to the hydroxyl groups of bisphenol A with epichlorohydrin.

An epoxy resin having an epoxy equivalent of about 70 to about 3300, preferably about 100 to about 1000, a softening point (as determined by the Durran's method) of about 60 to about 150, preferably about 65° to about 95° C., and a viscosity (25° C.) of about 10 to about 30000 cps, preferably about 1000 to about 15000, is generally used.

When an epoxy resin as mentioned above is used, a known curing agent for the epoxy resin is generally used in combination with the epoxy resin. As the curing agent, there can be mentioned a boron trifluoride/amine complex, a tertiary amine, a quaternary ammonium salt, a borate compound, an imidazole compound, a metal salt compound, an amide compound, a urea compound, a melamine compound, an isocyanate compound, a cyanate compound, a phenolic compound, an aromatic or aliphatic amine compound, an acid anhydride and a polyamine compound.

Another preferred example of the thermosetting resin is a phenolic resin obtained by reaction of a phenol with an aliphatic aldehyde, and this phenolic resin includes a resol resin obtained by condensation using an alkali as the catalyst and a novolak resin obtained by condensation using an acid as the catalyst. Since the former resin is generally in the form of a liquid or paste, the former resin is suitably used when other components are incorporated and curing is then carried out. In case of the latter resin, it is important that the state of a prepolymer should be maintained by sufficiently adjusting the reaction. Phenolic resins having a viscosity (25° C.) of about 100 to about 10000 cps, preferably about 200 to about 5000 cps, and softening point of about 50° to about 150° C., preferably about 70° to about 110° C., are generally used.

As the curing agent for the novolak type phenolic resin, there are used curing agents customarily used, for example, hexamine, paraformaldehyde and a resol type phenolic resin.

Still another preferred example of the thermosetting resin is a polyimide resin which is a mixture or preliminary reaction product of a polyamine represented by the general formula R-(NH$_2$)$_n$ (in which R stands for a divalent organic group and n is an integer of at least 2) and an unsaturated bismaleimide represented by the general formula

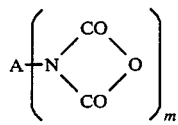

(in which A stands for an organic group having at least 2 carbon atoms, and m is an integer of from 2 to 4).

As the polyamine, there can be mentioned, for example, hexamethylene-diamine, p-phenylene-diamine, 4,4'-diaminodiphenylmethane, 4,4'-diaminodiphenyl ether, 4,4'-diaminodiphenyl ketone, 4,4'-diaminodiphenyl sulfone and xylene-diamine. As the unsaturated bismaleimide, there can be mentioned, for example, N,N'-phenylene bismaleimide, N,N'-hexamethylene bismaleimide, N,N'-methylene-di-p-phenylene bismaleimide, N,N'-hydroxy-di-p-phenylene bismaleimide, N,N'-4,4'-benzophenone bismaleimide, N,N'-(3,3'-dimethyl)-methylene-di-p-phenylene bismaleimide, N,N'-4,4'-dicyclohexylmethane maleimide, N,N'-m- or p-xylylene bismaleimide, N,N'-(3,3'-diethyl)methylene-di-p-phenylene bismaleimide and N,N'-m-toluylene dimaleimide. The unsaturated bismaleimide may be substituted with up to about 60% by weight of a monomaleimide compound such as N-allylmaleimide, N-propylmaleimide, N-hexylmaleimide or N-phenylmaleimide.

The polyimide resin prepared from the foregoing components may be used in combination with an epoxy resin as mentioned above or an epoxy group-containing vinyl monomer such as glycidyl acrylate, glycidyl methacrylate or allylglycidyl ether.

A still further preferred example of the thermosetting resin is an unsaturated polyester resin. As the unsaturated polyester resin, there can be mentioned a composition comprising (a) an unsaturated polyester resin having an α,β-unsaturated bond and an acid value smaller than 25, which is a reaction product of a polyol and a polycarboxylic acid, (b) a vinyl monomer copolymerizable with the unsaturated polyester, such as styrene, divinylbenzene, α-methylstyrene, an alkyl (meth)acrylate or ethylene glycol di(meth)acrylate, (c) a radical polymerization initiator such as dicumyl peroxide or benzoyl peroxide and, optionally, (d) a promoter such as cobalt naphthenate.

At least one of known additives such as lubricants, mold release agents, antioxidants, softeners, plasticizers, fillers, colorants, foaming agents and crosslinking agents can be added to the thermosetting polymer matrix used in the present invention according to the known recipe.

(iii) Cured rubber

The cured rubber used as the matrix in the present invention should be such that the curing temperature of the uncured rubber is lower than 220° C. If the curing temperature exceeds 220° C., the molecularly oriented and silane-crosslinked ultra-high-molecular-weight polyethylene fiber built in the fiber-reinforced polymer molded body substantially loses the orientation crystal structure. It is preferred that the curing temperature of the matrix rubber used be 100° to 200° C., especially 150° to 180° C.

As preferred examples of the matrix rubber, there can be mentioned natural rubber (NR), styrene/butadiene rubber (SBR), nitrile rubber (acrylonitrile/butadiene rubber, NBR), butadiene rubber (BR), isoprene rubber (IR), chloroprene rubber (CR), polysulfide rubber, urethane rubber, acrylic rubber, butyl rubber (IIR), chlorosulfonated rubber, epichlorohydrin rubber, fluorine rubber, silicone rubber, ethylene/propylene rubber (EPM, EPR), ethylene/propylene/diene rubber (EPDM, EPT), ethylene/butene rubber and ehtylene/butene/diene rubber.

At least one of known additives such as sulfur, a curing promoter, a curing assistant, a lubricant, carbon black, stearic acid, zinc flower, talc, clay, calcium carbonate, silica, an antioxidant, a weathering agent, a process oil, a tackifier, a pigment, a foaming agent and an organic peroxide is added to the rubber used in the present invention according to the known recipe.

Preparation Process

The molded body of the present invention is prepared by arranging the reinforcing fiber layer in the form as described above in the plane direction and combining the reinforcing fiber layer with the polymer as described above in the state where at least the ends of the reinforcing fiber layer are restrained. Namely, in the case where the polymer is a thermoplastic resin, the reinforcing fiber layer is combined with the melt of the thermoplastic resin and the melt is solidified. In the case where the polymer is a thermosetting resin, the reinforcing fiber layer is combined with a monomer or prepolymer of the thermosetting resin and curing is then carried out. In the case where the polymer is a rubber, the reinforcing fiber layer is combined with an uncured rubber and the uncured rubber is cured or crosslinked.

Various methods can be adopted for combining the reinforcing fiber layer with the melt of the thermoplastic resin. For example, there can be adopted a method in which a preformed film or sheet of the thermoplastic resin is piled on the reinforcing fiber layer and the piled assembly is pressed at a temperature where the thermoplastic resin is molten but the orientation crystal structure of the ultra-high-molecular-weight polyethylene fiber in the reinforcing fiber layer is substantially maintained. This pressing can be accomplished by a batchwise or semi-continuous operation using a hot press or a continuous operation using a hot roll press. It is important that at this pressing operation, the ends of the reinforcing fiber layer should be restrained. This can be accomplished, for example, by winding the fiber on a pressing plate in advance or applying an appropriate tension to the reinforcing fiber layer at the pressing operation. In the case where the fiber is arranged in the machine direction and the direction orthogonal thereto, such a tension is applied that free shrinkage in these two directions is not allowed.

According to another method, an extrudate of the thermoplastic resin in the molten state is piled on the reinforcing fiber layer and the assembly is pressed to effect integration. For example, the thermoplastic resin is extruded between two reinforcing fiber layers to effect integration or the thermoplastic resin is extruded on both the sides of a single reinforcing fiber layer to effect integration. Of course, there can be adopted a method in which a plurality of reinforcing fiber layers and a plurality of extrudates of the thermoplastic resin are piled alternately and the assembly is pressed to effect integration.

Various methods can be adopted for combining the reinforcing fiber layer with a monomer or prepolymer of the thermosetting polymer. For example, a film or tape of a prepolymer in the B-stage is piled on the reinforcing fiber layer and the assembly is pressed and set at a temperature where the prepolymer of the thermosetting polymer is set but the orientation crystal structure of the ultra-high-molecular-weight polyethylene fiber in the reinforcing fiber layer is substantially maintained. Other conditions are the same as those mentioned above with respect to the thermoplastic resin.

According to another method, the reinforcing fiber layer is impregnated with a monomer or prepolymer of the thermosetting polymer, and one or more of thus impregnated reinforcing fiber layers are pressed and set at a temperature where the monomer or prepolymer of the thermosetting polymer is set but the orientation crystal structure of the ultra-high-molecular-weight polyethylene fiber in the reinforcing layer is substantially maintained.

Various methods can be adopted for combining the reinforcing fiber layer with the uncured rubber and effecting crosslinking. For example, a film or sheet of a rubber compound formed by kneading the uncured rubber with a crosslinking agent and the like is piled on the reinforcing fiber layer and the assembly is pressed and crosslinked at a temperature where the rubber is crosslinked but the orientation crystal structure of the ultra-high-molecular-weight polyethylene fiber in the reinforcing layer is substantially maintained.

The fiber-reinforced polymer molded body of the present invention is not limited to a molded body having a two-dimensional shape. For example, a fiber-reinforced polymer molded body having a tubular shape can be obtained by arranging a filament or a non-woven fabric, woven fabric or knitted fabric of the filament in the form of a tube, extruding a thermoplastic resin in the form of a tube through a circular die and integrating both the tubes within or outside the die, or by impregnating or covering the filament or fabric arranged in the form of a tube with a prepolymer or monomer of a thermosetting polymer or by covering the filament or fabric arranged in the form of a tube with a rubber. Moreover, if an electric wire or optical cable is used as the core and the above-mentioned molding method is applied, a sheath of the fiber-reinforced polymer molded body can be formed.

According to the present invention, by integrating a molecularly oriented and silane-crosslinked ultra-high-molecular-weight polyethylene fiber under restraint conditions with a polymer as described above, the fiber can be made present as the reinforcing fiber layer in the polymer matrix in the state where the orientation crystal structure of the fiber is substantially retained.

Excellent tensile characteristics of the fiber are given to the molded body and since the fiber is silane-modified, the fiber shows a good adhesivement to not only polyethylene but also other polymers. Accordingly, a molded body having a high modulus and a high strength can be obtained.

Moreover, if a polyolefin matrix is used, the obtained molded body has an excellent electric insulating property and has a smaller dielectric loss and much better electric characteristics than a molded body obtained by using an epoxy resin or an unsaturated polyester resin as the matrix.

Furthermore, in the case where a cured rubber matrix is used, since the ultra-high-molecular-weight polyethylene fiber is silane-modified and excellent in the adhesiveness to the cured rubber, there can be obtained a molded body having a high modulus and a high strength, and the molded body can be suitably used in various fields as high-pressure hoses, coated fabrics, tires and other various products.

The present invention will now be described in detail with reference to the following examples that by no means limit the scope of the invention.

EXAMPLE 1

(Preparation of Silane-Crosslinked Drawn Ultra-High-Molecular-Weight Polyethylene Fiber)

Grafting and Spinning 100 parts by weight of powdery ultra-high-molecular-weight polyethylene (intrinsic viscosity $(\eta)=8.20$ dl/g) was homogeneously mixed with 10 parts by weight of vinyltrimethoxysilane (supplied by Shinetsu Kagaku) and 0.1 part by weight of 2,5-dimethyl-2,5-di(-tert-butylperoxy)hexane (Perhexa 25B supplied by Nippon Yushi), and powdery paraffin wax (Luvax 1266 supplied by Nippon Seiro, melting point=69° C.) was further added in an amount of 370 parts by weight per 100 parts by weight of the ultra-high-molecular-weight polyethylene. Then, the mixture was melt-kneaded at a set temperature of 200° C. by using a screw type extruder. (screw diameter=20 mm, L/D=25), and the melt was spun from a die having an orifice diameter of 2 mm to complete silane grafting. The spun fiber was cooled and solidified by air maintained at room temperature at an air gap of 180 cm to obtain an undrawn silane-grafted ultra-high-molecular-weight polyethylene fiber. This undrawn yarn had a fineness of 800 denier, and the draft ratio at the spinning step was 36.4. The winding speed was 90 m/min.

Determination of Amount of Grafted Silane

In 200 cc of p-xylene heated and maintained at 135° C. was dissolved about 8 g of the undrawn grafted fiber prepared according to the above-mentioned method, and then, the ultra-high-molecular-weight polyethylene was precipitated in an excessive amount of hexane at normal temperature to remove the paraffin wax and unreacted silane compound. Then, the grafted amount as the amount (% by weight) of Si was determined by the weight method. It was found that the grafted amount was 0.57% by weight.

Drawing

The grafted undrawn fiber spun from the ultra-high-molecular-weight polyethylene composition according to the above-mentioned method was drawn under conditions described below to obtain an oriented drawn fiber. Namely, two-staged drawing was carried out in drawing tanks containing n-decane as the heating medium by using three godet rolls. The temperature in the second drawing tank was 110° C. and the temperature in the first drawing tank was 120° C., and the effective length of each tank was 50 cm. A desired draw ratio was obtained by changing the rotation number of the third godet roll while maintaining the rotation speed of the first godet roll at 0.5 m/min. The rotation speed of the second godet roll was appropriately selected within a range where stable drawing was possible. The draw ratio was calculated from the rotation ratio between the first and third godet rolls.

The obtained fiber was dried at room temperature under reduced pressure to obtain a silane-grafted ultra-high-molecular-weight polyethylene fiber.

Impregnation with Crosslinking Catalyst

In the case where the silane compound-grafted oriented ultra-high-molecular-weight polyethylene fiber was further crosslinked, a mixture of n-decane and dibutyl tin dilaurate in the same amount as that of n-decane was used as the heating medium in the second drawing tank at the drawing step, and simultaneously with extraction of the paraffin wax, the fiber was impregnated with dibutyl tin dilaurate. The obtained fiber was dried at room temperature under reduced pressure until the decane smell was not felt.

Crosslinking

Then, the fiber was allowed to stand in boiling water for 12 hours to complete crosslinking.

Measurement of Gel Content

About 0.4 g of the silane-crosslinked drawn ultra-high-molecular-weight polyethylene fiber obtained according to the above-mentioned method was charged in an Erlenmeyer flask equipped with a condenser, in which 200 ml of p-xylene was charged, and the fiber was stirred in the boiled state for 4 hours. The insoluble substance was recovered by filtration using a 300-mesh stainless steel net, dried at 80° C. under reduced pressure and weighed to determine the proportion of the insoluble substance. The gel content was calculated according to the following formula:

$$\text{Gel content (\%)} = \frac{\text{weight of insoluble substance}}{\text{weight of sample}} \times 100$$

The gel content in the above-mentioned sample was 51.4%.

The tensile modulus, tensile strength and elongation at the breaking point were measured at room temperature (23° C.) by using an Instron universal tester (Model 1123 supplied by Instron Co.). The sample length between clamps was 100 mm and the pulling speed was 100 m/min. Incidentally, the tensile modulus is the initial modulus. The sectional area of the fiber necessary for the calculation was determined from the measured values of the weight and length of the fiber based on the assumption that the density of the polyethylene was 0.96 g/cm³.

The physical properties of the so-obtained silane-crosslinked drawn ultra-high-molecular-weight polyethylene fiber are shown in Table 1.

TABLE 1

| Sample | Sample 1 |
| --- | --- |
| Fineness | 8.3 denier |
| Draw Ratio | 19.4 |
| Strength | 1.55 GPa |
| Modulus | 40.1 GPa |
| Elongation | 7.5% |

The inherent crystal melting temperature (Tm) of the ultra-high-molecular-weight polyethylene obtained as the main melting peak at the time of the second temperature elevation was 132.2° C. The ratio of the heat of fusion based on Tp to the total crystal heat of fusion and the ratio of the heat of fusion based on Tp1 to the total crystal heat of fusion were 73% and 22%, respectively. The main peak of Tp2 resided at 151.0° C. and the main peak of Tp1 resided at 226.5° C.

Evaluation of Creep Characteristics

Figure 8:
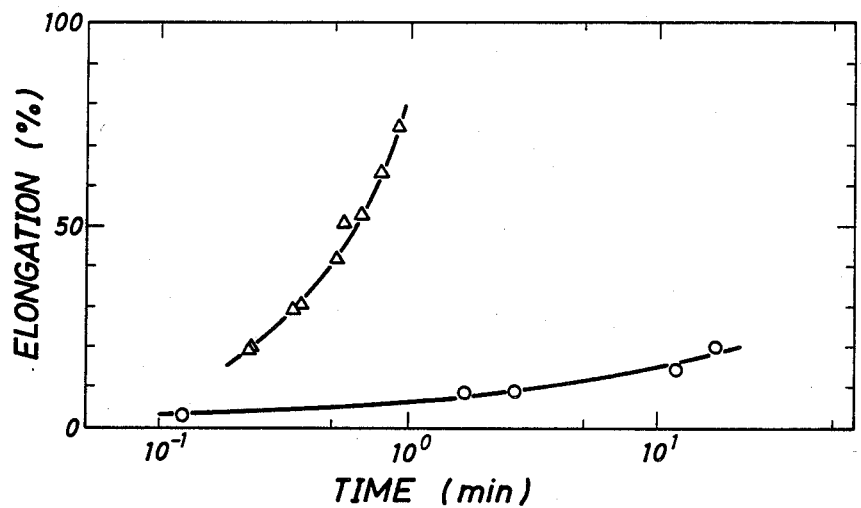
FIG. 8 is a graph illustrating creep characteristics of drawn oriented ultra-high-molecular-weight polyethylene fibers prepared in Example 1 and Comparative Example 1, determined under a load corresponding to 30% of the breaking load measured at room temperature in an atmosphere maintained at 70° C.

The creep test was carried out at an atmosphere temperature of 70° C. and a sample length of 1 cm by using a thermal stress strain measurement apparatus (Model TMA/SS10 supplied by Seiko Denshi Kogyo). The results obtained when the measurement was conducted under a load corresponding to 30% of the breaking load are shown in FIG. 8. It is seen that the silane-crosslinked drawn ultra-high-molecular-weight polyethylene fiber obtained in the present example (sample 1) was highly improved in the creep characteristics over a drawn ultra-high-molecular-weight polyethylene fiber obtained in Comparative Example 1 given hereinafter (sample 2).

Furthermore, the creep test was carried out at an atmosphere temperature of 70° C. under a load corresponding to 50% of the breaking load at room temperature. The elongations observed after the lapse of 1 minute, 2 minutes and 3 minutes from the point of application to the load are shown in Table 2.

Evaluation of Adhesiveness

The adhesiveness was evaluated according to the pull-out method. Araldite Rapid (epoxy resin supplied by Showa Polymer) were used as the adherend resin, and the test was carried out according to the adhesive force method A (P test) of the test of JIS L-1017 for synthetic fiber tire cords.

TABLE 2

| Sample | Time (minutes) | Elongation (%) |
| --- | --- | --- |
| sample 1 | 1 | 7.4 |
| sample 1 | 2 | 8.2 |
| sample 1 | 3 | 8.6 |

Strength Retention Ratio after Heat History

The heat history test was conducted by allowing the sample to stand still in a gear oven (Perfect Oven supplied by Tabai Seisakusho). The sample had a length of about 3 m and was folded on a stainless steel frame having a plurality of pulleys arranged on both the ends thereof. Both the ends of the sample were fixed to such an extent that the sample sample did not slacken, but any tension was not positively applied to the sample. The obtained results are shown in Table 3.

TABLE 3

| Sample | sample 1 | sample 1 |
| --- | --- | --- |
| Oven Temperature | 180° C. | 200° C. |
| Standing Time | 10 minutes | 5 minutes |
| Strength | 1.53 GPa | 1.40 GPa |
| Strength Retention Ratio | 99% | 90% |
| Modulus | 32.5 GPa | 26.5 GPa |
| Modulus Retention Ratio | 81% | 66% |
| Elongation | 9.5% | 10.7% |
| Elongation Retention Ratio | 126% | 143% |

From the results shown in Table 3, it is seen that the silane-crosslinked drawn ultra-high-molecular-weight polyethylene fiber obtained in the present example had surprisingly excellent heat-resistant strength retention characteristics.

Measurement of Orientation Degree by X-Ray Diffractometry

The fiber was wound by 10 to 20 turns on a Phillips type holder, and the fiber was cut on one side and used in the state of a bundle for the measurement. the orientation degree was determined by measuring the reflection on (110) plane of the polyethylene crystal appearing on the equator line by using a diffractometer and determining the reflection intensity distribution. The calculation was performed according to the method of Go et al. The so-obtained orientation degree was 0.955. (Formation of Fiber-Reinforced Resin Molded Body)

A fiber-reinforced resin molded body was obtained according to a process described below by using powdery high-density polyethylene (intrinsic viscosity $(\eta)=2.3$ dl/g, melting point=127° C.) as the matrix resin and the silane-crosslinked drawn ultra-high-molecular-weight polyethylene fiber as the reinforcing fiber. The above-mentioned silane-crosslinked drawn ultra-high-molecular-weight polyethylene fiber was wound alternately in directions orthogonal to each other on a stainless steel frame having a periphery width of 15 mm and a thickness of 1 mm and including a square hollow portion of 150 mm×150 mm so that eight layers of the fiber were formed as a whole on the front and back sides. The winding operation was performed so that in each layer, adjacent fibers adhered closely to each other but they were not overlapped. Then, the above-mentioned powdery high-density polyethylene in the same amount as that of the silane-crosslinked drawn ultra-high-molecular-weight polyethylene fiber necessary for lamination was uniformly placed on the laminated fiber surface in the hollow portion of the frame. Then, the frame was inserted between two stainless steel plates and the assembly was heated and compressed at 170° C. for 6 minutes by a hot press. The compressing force was adjusted to 50 kg/cm². Then, cooling was effected by a water cooling press, whereby the molding operation was completed. The periphery of the central hollow portion was cut off and a sample for the measurement of the physical properties was obtained.

The thickness of the sample was 1.5 mm, and the content of the silane-crosslinked drawn ultra-high-molecular-weight polyethylene fiber content was 50% by volume. The flexural modulus and flexural strength of the sample were measured at room temperature (23° C.) according to the JIS K-6911 (ASTM D-790) by using an Instron universal tester (Model 1123 supplied by Instron Co.). Incidentally, a test piece was prepared by punching the sample by a rectangular dumbbell of 50 mm×25 mm for the bending test orthogonally to the fiber in the sample. The flexural strength and flexural modulus of the obtained sample (sample A) are shown in Table 4.

TABLE 4

| Sample | sample A |
| --- | --- |
| Flexural Strength | 0.043 GPa |
| Flexural Modulus | 2.13 GPa |

The tensile yield strength and tensile elastic modulus were measured according to JIS K-6760 (ASTM D-638-68). A test piece was prepared by punching the sample by a dumbbell of JIS No. 2 orthogonally to the fiber. The obtained results are shown in Table 5.

TABLE 5

| Sample | sample A |
| --- | --- |
| Tensile Yield Strength | 0.123 GPa |
| Tensile Modulus | 23.3 GPa |

It is seen that as compared with a molded body obtained in Comparative Example 2 given hereinafter, in the molded body of the present example, the fiber exerted a sufficient reinforcing effect even after the molding operation conducted at a temperature much higher than the molding temperature customarily adopted for polyethylene fibers.

EXAMPLE 2

(Formation of Fiber-Reinforced Resin Molded Body)

A fiber-reinforced resin molded body is prepared under conditions described below by using powdery polypropylene (intrinsic viscosity $(\eta)=2.0$ dl/g, melting point=160° C.) as the matrix resin and the silane-crosslinked drawn ultra-high-molecular-weight polyethylene fiber prepared according to the process described in Example 1 as the reinforcing fiber. The silane-crosslinked drawn ultra-high-molecular-weight polyethylene fiber is wound alternately in directions orthogonal to each other on a stainless steel frame having a periphery width of 15 mm and a thickness of 1 mm and including a square hollow portion of 150 mm×150 mm so that eight layers of the fiber are formed as a whole on the front and back sides. The winding operation is performed so that in each layer, adjacent fibers adhered closely to each other but they are not overlapped. The above-mentioned powdery polypropylene in the same amount as that of the silane-crosslinked drawn ultra-high-molecular-weight polyethylene fiber necessary for lamination is uniformly placed on the laminated fiber surface in the hollow portion of the frame. Then, the frame is inserted between two stainless steel plates and the assembly is heated and compressed at 180° C. for 6 minutes by a hot press. The compressing force is adjusted to 50 kg/cm². Then, cooling is effected by a water cooling press, whereby the molding operation is completed. The thickness of the obtained fiber-reinforced resin molded body is 1.5 mm, and the content of the silane-crosslinked drawn ultra-high-molecular-weight polyethylene fiber is 47% by volume. The flexural modulus and flexural strength of the fiber-reinforced resin molded body (sample B) determined according to the method described in Example 1 are shown in Table 6.

TABLE 6

| Sample | sample B |
| --- | --- |
| Flexural Strength | 0.057 GPa |
| Flexural Modulus | 8.27 GPa |

The tensile yield strength and tensile modulus determined according to the method described in Example 1 are shown in Table 7.

TABLE 7

| Sample | sample B |
| --- | --- |
| Tensile Yield Strength | 0.273 GPa |
| Tensile Elastic Modulus | 3.61 GPa |

COMPARATIVE EXAMPLE

Preparation of Drawn Fiber of Ultra-High-Molecular-Weight Polyethylene

A mixture of 100 parts by weight of powdery ultra-high-molecular-weight polyethylene (intrinsic viscosity $(\eta)=8.20$) and 320 parts by weight of the powdery paraffin wax described in Example 1 was spun according to the process described in Example 1. The draft ratio was 25, and the fineness of the undrawn yarn was 1000 denier. Then, the undrawn fiber was drawn in the same manner as described in Example 1. The physical properties of the obtained drawn fiber (sample 2) are shown in Table 8.

TABLE 8

| Sample | sample 2 |
|---|---|
| Fineness | 8.5 denier |
| Draw ratio | 28.0 |
| Strength | 1.68 GPa |
| Modulus | 45.5 GPa |
| Elongation | 6.3% |

The melting characteristic curve of this fiber (sample 2) is shown in FIG. 3. The inherent crystal melting temperature (Tm) determined as the main melting peak at the time of the second temperature elevation was 132.2° C. The ratio of the heat of fusion based on Tp to the total crystal heat of fusion and the ratio of the heat of fusion based on Tp1 to the total crystal heat of fusion were 32.1% and 1.7%, respectively.

The creep characteristics were measured according to the method for the evaluation of the creep characteristics, described in Example 1. The obtained results are shown in FIG. 8.

Figure 9:
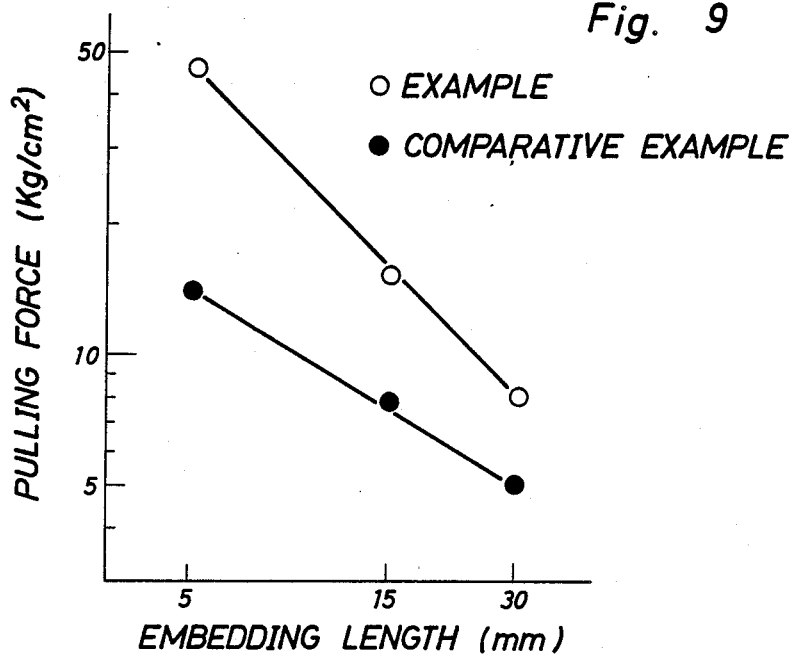
FIG. 9 is a graph illustrating the relation between the embedding length and the pulling-out force at the adhesiveness test of the silane-crosslinked drawn ultra-highmolecular-weight polyethylene fiber prepared in Example 1 and the oriented ultra-high-molecular-weight polyethylene fiber prepared in Comparative Example 1.

When the creep characteristics were determined according to the method described in Example 1 (atmosphere temperature=70° C., load=50% of breaking load at room temperature), the sample was broken just after application of the load. The bonding force was determined according to the method for evaluation of the adhesiveness, described in Example 1. The obtained results are shown in FIG. 9 together with the results obtained in Example 1.

The strength retention ratio was determined according to the method for determining the strength retention ratio after the heat history, described in Example 1. However, at the oven temperature of 180° C., the sample was completely molten before the sample was allowed to stand for 10 minutes.

(Formation of Fiber-Retention Resin Molded Body)

According to the method described in Example 1, the laminate of the above-mentioned ultra-high-molecular-weight polyethylene fiber was embedded in the powdery high-density polyethylene powder described in Example 1 as the matrix resin by carrying out heat compression at 170° C. for 6 minutes by a hot press, with a view to obtaining a fiber-reinforced resin molded body. After cooling, the fiber layer in the interior of the molded body was examined with the naked eye. It was found that the fiber was molten and dispersed as islands. The physical properties of the molded body were the same as those of sample C of Comparative Example 2 given hereinafter.

COMPARATIVE EXAMPLE 2

A high-density polyethylene press-molded body was prepared by heating and compressing the powdery high-density polyethylene described as the matrix resin at 170° C. for 6 minutes by a heat press molding machine, and cooling and compressing the press-molded body by a cooling press molding machine. The flexural strength and flexural modulus of the obtained molded body (sample C) were determined according to the method described in Example 1. The obtained results are shown in Table 9.

TABLE 9

| Sample | sample C |
|---|---|
| Flexural Strength | 0.027 GPa |
| Flexural Modulus | 1.20 GPa |

The tensile yield strength and tensile modulus determined according to the method described in Example 1 are shown in Table 10.

TABLE 10

| Sample | sample C |
|---|---|
| Tensile Yield Strength | 0.023 GPa |
| Tensile Modulus | 0.53 GPa |

COMPARATIVE EXAMPLE 3

A polypropylene press-molded body was prepared by heating and compressing the powdery polypropylene described in Example 2 as the matrix resin at 180° C. for 6 minutes by a press-molding machine, and cooling and compressing the press-molded body by a cooling press-molding machine. The flexural strength and flexural modulus of the molded body (sample D) were determined according to the method described in Example 1. The obtained results are shown in Table 11.

TABLE 11

| Sample | sample D |
|---|---|
| Flexural Strength | 0.038 GPa |
| Flexural Modulus | 1.60 GPa |

The tensile yield strength and tensile modulus determined according to the method described in Example 1 are shown in Table 12.

TABLE 12

| Sample | sample D |
|---|---|
| Tensile Yield Strength | 0.037 GPa |
| Tensile Modulus | 0.82 GPa |

EXAMPLE 3

(Formation of Fiber-Reinforced Resin Molded Body)

A fiber-reinforced resin molded body is prepared according to the following method by using powdery nylon 12 (relative viscosity=2.45, melting point=176° C.) as the matrix resin and the silane-crosslinked drawn ultra-high-molecular-weight polyethylene fiber prepared in Example 1 as the reinforcing fiber. The above-mentioned silane-crosslinked drawn ultra-high-molecular-weight polyethylene fiber is wound alternately in direction orthogonal to each other on a stainless steel frame having a periphery width of 15 mm and a thickness of 1 mm and including a square hollow portion of 150 mm×150 mm so that eight layers of the fibers are formed as a whole on the front and back sides. The winding operation is performed so that in each layer, adjacent fibers adhered closely to each other but they are not overlapped. Then, the above-mentioned powdery nylon 12 in the same amount as that of the silane-crosslinked drawn ultra-high-molecular-weight polyethylene fiber necessary for lamination is uniformly placed on the laminated fiber surface in the hollow portion of the frame. Then, the frame is inserted between two stainless steel plates and the assembly is heated and compressed at 195° C. for 6 minutes. The compressing force is 50 kg/cm². Prior to this operation, the powdery nylon 12 is dried at 105° C. for 12 hours in a nitrogen atmosphere. Then, the press-molded body is compressed and cooled by a water cooling press-molding machine. The thickness of the obtained fiber-reinforced resin molded body is 1.5 mm, and the content of the silane-crosslinked drawn ultra-high-molecular-weight polyethylene fiber is 52% by volume. The flexural modulus and flexural strength of the fiber-reinforced resin molded body (sample E) are determined according to the method described in Example 1. The obtained results are shown in Table 13.

TABLE 13

| Sample | sample E |
|---|---|
| Flexural Strength | 0.051 GPa |
| Flexural Modulus | 7.20 GPa |

The tensile yield strength and tensile elastic modulus determined according to the method described in Example 1 are shown in Table 14.

TABLE 14

| Sample | sample E |
|---|---|
| Tensile Yield Strength | 0.375 GPa |
| Tensile Modulus | 29.4 GPa |

COMPARATIVE EXAMPLE 4

The powdery nylon 12 described in Example 3 as the matrix resin was heated and compressed at 195° C. for 6 minutes by a heat press-molding machine, and the press-molded body was cooled and compressed by a cooling press-molding machine to obtain a nylon 12 press-molded body (sample F). The flexural strength adn flexural modulus were determined according to the method described in Example 1. The obtained results are shown in Table 15.

TABLE 15

| Sample | sample F |
|---|---|
| Flexural Strength | 0.045 GPa |
| Flexural Modulus | 1.18 GPa |

The tensile yield strength and tensile modulus measured according to the method described in Example 1 are shown in Table 16.

TABLE 16

| Sample | sample F |
|---|---|
| Tensile Yield Strength | 0.048 GPa |
| Tensile Modulus | 1.25 GPa |

EXAMPLE 4

(Formation of Fiber-Reinforced Resin Molded Body)

A varnish was prepared by dissolving 100 g of an epoxy resin (Epomic R-301 supplied by Mitsui Petrochemical Industries, Ltd.), 30 g of an epoxy resin (Epomic R-140 supplied by Mitsui Petrochemical Industries, Ltd.), 4 g of dicyandiamide and 3 g of N-(3,4-dichlorophenyl)-N',N'-dimethylurea in a mixed solvent of 33 g of methylethylketone and 20 g of N,N-dimethylformamide. The silane-crosslinked drawn ultra-high-molecular-weight polyethylene fiber prepared in Example 1 was wound and fixed onto a stainless steel frame and was impregnated with the above-mentioned varnish and dried at 110° C. for 20 minutes to obtain a unidirectional prepreg. Then, 9 of the so-obtained prepregs were alternately laminated and the peripheral portion of the laminate was fixed by a metal frame and the laminate was press-molded at 160° C. for 6 minutes to obtain a 9-ply laminate (sample G). The content of the silane-crosslinked drawn ultra-high-molecular-weight polyethylene fiber in the laminate was 58.0% by volume.

The flexural modulus and flexural strength were determined at room temperature (23° C.) according to JIS K-6911 (ASTM D-790) by using an Instron universal tester (Model 1123 supplied by Instron Co.). A test piece of 50 mm×25 mm was prepared by cutting the laminate orthogonally to the fiber and was used for the test. The obtained results are shown in Table 17.

TABLE 17

| Sample | sample G |
|---|---|
| Flexural Strength | 0.25 GPa |
| Flexural Modulus | 14.2 GPa |

The tensile yield strength and tensile modulus were determined according to JIS K-6760 (ASTM D-638-68). A test piece was prepared by punching the laminate by a dumbbell of JIS No. 2. The obtained results are shown in Table 18.

TABLE 18

| Sample | sample G |
|---|---|
| Tensile Yield Strength | 0.345 GPa |
| Tensile Modulus | 3.5 GPa |

COMPARATIVE EXAMPLE 5

A unidirectional prepeg was prepared according to the process described in Example 4 by using the epoxy resins described in Example 4 as the matrix resin and the drawn ultra-high-molecular-weight polyethylene fiber described in Comparative Example 1. Preparation of a laminate under the same conditions as described in Example 4 was tried by alternatingly laminating the so-obtained prepegs. When the interior of the molded body was examined with the naked eye after cooling, it was found that the fiber was molten and the shape of the fiber was most.

EXAMPLE 5

(Formation of Fiber-Reinforced Resin Molded Body)

The silane-crosslinked drawn ultra-high-molecular-weight polyethylene fiber described in Example 1 was wound and fixed onto a stainless steel frame and was then impregnated with a composition comprising 100 g of an unsaturated polyester resin (Rigolac 150HR supplied by Showa Kobunshi), 0.5 g of benzoyl peroxide, 0.5 g of cobalt naphthenate and 2 g of magnesium oxide. Press molding was carried out at room temperature to obtain a unidirectional prepreg. Then, 9 of the so-obtained prepregs were alternately laminated, and the peripheral portion of the laminate was fixed by a metal frame and press molding was carried out at 160° C. for 6 minutes to obtain a 9-ply laminate (sample H). The content of the silane-crosslinked drawn ultra-high-molecular-weight polyethylene fiber in the obtained fiber-reinforced resin molded body was 56.0% by volume.

The flexural strength and flexural modulus were determined according to the method described in Example 4. The obtained results are shown in Table 19.

TABLE 19

| Sample | sample H |
| --- | --- |
| Flexural Strength | 0.13 GPa |
| Flexural Modulus | 5.60 GPa |

The tensile yield strength and tensile modulus determined according to the method described in Example 4 are shown in Table 20.

TABLE 20

| Sample | sample H |
| --- | --- |
| Tensile Yield Strength | 0.033 GPa |
| Tensile Modulus | 6.30 GPa |

COMPARATIVE EXAMPLE 6

The varnish used in Example 4 was charged in a metal frame and press-molded at 160° C. for 6 minutes to obtain an epoxy resin plate having a thickness of 1.5 mm (sample I). The flexural strength and flexural modulus and the tensile yield strength and tensile modulus were determined according to the methods described in Example 4. The obtained results are shown in Tables 21 and 22.

TABLE 21

| Sample | sample I |
| --- | --- |
| Flexural Strength | 0.11 GPa |
| Flexural Modulus | 4.73 GPa |

TABLE 22

| Sample | sample I |
| --- | --- |
| Tensile Yield Strength | 0.051 GPa |
| Tensile Modulus | 0.70 GPa |

EXAMPLE 6

(Formation of Fiber-Reinforced Rubber Molded Body)

A compound rubber is prepared by mixing a composition shown in Table 23 for 30 minutes by vapor-water cooling two rolls. The surface temperature of the front roll is 50° C. and the surface temperature of the back roll is 60° C. The rotation numbers of the front and back rolls are 12.6 rpm and 15.7 rpm, respectively.

TABLE 23

| Ingredient | Trademark | Maker | Parts by weight |
| --- | --- | --- | --- |
| NR | Rubber Smoke Sheet #1 | Shell Chemicals | 70 |
| SBR | JSR 1778 | Japan Synthetic Rubber | 41.3 |
| GPF carbon black | Asahi #55 | Asahi Carbon | 50 |
| naphthenic process oil | Circosol 2 × H | Sun Oil | 8 |
| zinc flower | Special Zinc Flower | Sakai Kagaku Kogyo | 5 |
| stearic acid | — | Matsumoto Yushi | 1.5 |
| butylated styrenated cresol | Wing Stay 100 | Goodyear | 1.0 |
| 2-benzothiazolyl disulfide | Axcell DM | Kawaguchi Kagaku | 0.85 |
| diphenylguanidine | Axcell D | Kawaguchi Kagaku | 0.15 |
| powdered sulfur for rubber | Kinka Fine Sulfur | Tsurumi Kagaku Kogyo | 2.5 |

The physical properties of the compound rubber (rubber sample 1) are shown in Table 24.

TABLE 24

| Sample | rubber sample 1 |
| --- | --- |
| $ML_{1+4}$ (100° C.) | 43 |
| $MS_{-3}$ (121° C.) | 22 minutes |

A cloth (fabric texture=rattan weave, base weight=310 g/m², yarn density=23 filaments/2.54 cm in longitudinal direction and 2 filaments/2.54 cm in lateral direction) formed by using a multi-filament yarn of the silane-crosslinked drawn ultra-high-molecular-weight polyethylene fiber prepared in Example 1 is embedded as the reinforcing fiber in the above-mentioned compound rubber and curing is carried out under conditions described below to obtain a fiber-reinforced cured sheet. The periphery of the cloth is secured to the periphery of a press mold and the cloth is heated at 157.2° C. for 10 minutes by using a spacer having a thickness of 2 mm in a heating press. At this point, a pressure of about 50 kg/cm² is applied to the sample. Then, the pressed body is cooled by a water-cooling press to obtain a fiber-reinforced rubber molded body (sample J). The obtained fiber-reinforced rubber molded body is punched in the longitudinal direction of the rattan fiber by a dumbbell of JIS No. 3 to obtain a test piece for the tensile test. The tensile test is carried out at room temperature and a pulling speed of 500 mm/min by an Instron universal tester (Model 1123 supplied by Instron Co.).

The physical properties of the fiber-reinforced rubber molded body determined by the above-mentioned method and the hardness determined by the method of JIS-A are shown in Table 25.

TABLE 25

| Sample | sample J |
| --- | --- |
| Strength at Break | 312 kgf/cm² |
| Elongation at Break | 6.5% |
| Hardness | 59 |

COMPARATIVE EXAMPLE 6

A cured sheet having a thickness of 2 mm is prepared from the rubber composition shown in Table 24 according to the method described in Example 6. The physical properties of the obtained cured sheet (sample K) determined according to the method described in Example 6 are shown in Table 26.

TABLE 26

| Sample | sample K |
|---|---|
| Strength at Break | 205 kgf/cm² |
| Elongation at Break | 540% |
| Hardness | 56 |

EXAMPLE 7

(Formation of Fiber-Reinforced Rubber Molded Body)

A compound rubber having a composition shown in Table 27 is prepared by using the same apparatus under the same conditions as described in Example 6.

TABLE 27

| Ingredient | Trademark | Maker | Parts by weight |
|---|---|---|---|
| EPDM | Mitsui EPT3072E | Mitsui Petrochemical Industries, Ltd. | 70 |
| EPDM | Mitsui EPT3070 | Mitsui Petrochemical Industries, Ltd. | 50 |
| zinc flower | Special Zinc Flower | Sakai Kagaku Kogyo | 5 |
| stearic acid | — | Matsumoto Yushi | 1 |
| FEF carbon black | Asahi #60 | Asahi Carbon | 100 |
| SRF carbon black | Asahi #50 | Asahi Carbon | 60 |
| heavy calcium carbonate | Heavy Calcium Carbonate S | Tsuchiya Kaolin Kogyo | 40 |
| paraffinic oil | Shell Flex 491J | Shell Chemicals | 84 |
| N—cyclohexyl-2-benzothiazole sulfamide | Axcell CZ | Kawaguchi Kagaku | 0.5 |
| ethylene thiourea | Axcell 22 | Kawaguchi Kagaku | 0.5 |
| tetramethylthiuram disulfide | Nocceler TT | Ohuchi Shinko Kagaku | 0.5 |
| dibutyl tin dithiocarbamate | Axcell BZ | Kawaguchi Kagaku | 1.5 |
| morphaline disulfide | Barnoc R | Ohuchi Shinko Kagaku | 1.5 |
| powdered sulfur for rubber | Kinka Fine Sulfur | Tsurumi Kagaku Kogyo | 0.5 |

The physical properties of the obtained compound rubber (rubber sample 2) are shown in Table 28.

TABLE 28

| Sample | rubber sample 2 |
|---|---|
| $ML_{1+4}$ (100° C.) | 47 |
| $WS_{-3}$ (125° C.)$_{+5}$ | 13.8 |

According to the method described in Example 6, a fiber-reinforced cured sheet having a thickness of 2 mm is prepared by using a cloth formed by using the silane-crosslinked drawn ultra-high-molecular-weight polyethylene fiber described in Example 1 as the reinforcing fiber and the above-mentioned compound rubber. Curing is conducted at 180° C. for 8 minutes. The physical properties of the obtained fiber-reinforced rubber molded body (sample L) are shown in Table 29.

TABLE 29

| Sample | sample L |
|---|---|
| Strength at Break | 295 kgf/cm² |
| Elongation at Break | 7.8% |
| Hardness | 62 |

COMPARATIVE EXAMPLE 7

A compound rubber having a composition shown in Table 27 is prepared according to the method described in Example 6. The compound rubber is formed into a cured sheet having a thickness of 2 mm under conditions described in Example 7. The physical properties of the obtained cured sheet (sample M) are shown in Table 30.

TABLE 30

| Sample | sample M |
|---|---|
| Strength at Break | 114 kgf/cm² |
| Elongation at Break | 460% |
| Hardness (JIS A) | 65 |

EXAMPLE 8

(Formation of Fiber-Reinforced Rubber Molded Body)

A compound rubber having a composition shown in Table 31 is prepared by using the same apparatus under the same conditions as described in Example 6.

TABLE 31

| Ingredient | Trademark | Maker | Parts by weight |
|---|---|---|---|
| SBR | JSR-1712 | Japan Synthetic Rubber | 100 |
| zinc flower | Special Zinc Flower | Sakai Kagaku Kogyo | 5 |
| SRF carbon black | Asahi #50 | Asahi Carbon | 50 |
| soft clay | Superite | Kobe Clay | 50 |
| fatty acid-treated calcium carbonate | Nobelite SS | Nitto Funka Kogyo | 20 |
| coumarone resin | Coumarone CL | Ohuchi Shinko Kagaku Kogyo | 10 |
| N—cyclohexyl-2-benzothiazole sulfamide | Axcell CZ | Kawaguchi Kagaku | 1.5 |
| tetramethylthiuram disulfide | Nocceler TT | Ohuchi Shinko Kagaku Kogyo | 1.5 |
| powdered sulfur | Kinka Fine Sulfur | Tsurumi Kagaku Kogyo | 0.5 |

TABLE 31-continued

| Ingredient | Trademark | Maker | Parts by weight |
|---|---|---|---|
| for rubber | | | |

According to the method described in Example 6, a fiber-reinforced cured sheet having a thickness of 2 mm is prepared by using a so-obtained compound rubber and a cloth formed by using the silane-crosslinked drawn ultra-high-molecular-weight polyethylene fiber described in Example 1. Curing is carried out at 150° C. for 15 minutes. The physical properties of the obtained fiber-reinforced rubber molded body (sample N) are shown in Table 32.

TABLE 32

| Sample | sample N |
|---|---|
| Strength at Break | 273 kgf/cm$^2$ |
| Elongation at Break | 6.8% |
| Hardness | 63 |

COMPARATIVE EXAMPLE 8

A compound rubber having a composition shown in Table 31 is prepared according to the method described in Example 6. A cured sheet having a thickness of 2 mm is prepared from the obtained compound rubber under the conditions described in Example 8. The physical properties of the obtained cured sheet (sample O) are shown in Table 33.

TABLE 33

| Sample | sample O |
|---|---|
| Strength at Break | 114 kgf/cm$^2$ |
| Elongation at Break | 460% |
| Hardness (JIS A) | 65 |

COMPARATIVE EXAMPLE 9

According to the method described in Example 6, a fiber-reinforced rubber molded body is prepared by using the compound rubber having the composition shown in Table 23 and a cloth (cloth texture=plain weave, base weight=295 g/m$^2$, yarn density=31 filaments/2.54 cm in either longitudinal or lateral direction) formed by using a drawn ultra-high-molecular-weight polyethylene fiber (Dyneema SK60 supplied by Dyneema Co., tensile modulus=80 GPa, tensile strength 2.4 GPa, multi-filament yarn) as the reinforcing fiber. The physical properties of the obtained fiber-reinforced rubber molded body (sample P) determined according to the method described in Example 6 are shown in Table 34.

TABLE 34

| Sample | sample P |
|---|---|
| Strength at Break | 73 kgf/cm$^2$ |
| Elongation at Break | 64% |
| Hardness (JIS A) | 59 |

The reason why the physical properties of the fiber-reinforced rubber molded body of this comparative example are drastically reduced as compared with the physical properties (Table 26) of the matrix rubber shown in Comparative Example 7 is that the fiber is molten. A merely drawn ultra-high-molecular-weight polyethylene fiber cannot resist even a heat history of 152.7° C.×about 10 minutes.

We claim:

1. A fiber-reinforced polymer molded body which comprises a matrix of a polymer having a processing temperature lower than 220° C. and at least one reinforcing layer of a molecularly oriented and silane-crosslinked ultra-high-molecular-weight polyethylene fiber, wherein said reinforcing layer is laminated with or embedded in the matrix in a state where the ends of said layer are restrained, said matrix is thermally formed or thermally cured, and the reinforcing layer substantially restrains the orientation crystal structure of the molecularly oriented and silane-grafted ultra-high-molecular-weight polyethylene fiber in the molded body.

2. A fiber-reinforcing polymer molded body as set forth in claim 1, wherein the molecularly oriented and silane-crosslinked ultra-high-molecular-weight polyethylene fiber has such characteristics that when the measurement is conducted under restraint conditions by using a differential scanning calorimeter, the cross-linked polyethylene fiber has at least two crystal melting peaks (Tp) at temperatures higher by at least 10° C. than the inherent crystal melting temperature (Tm) of the ultra-high-molecular-weight polyethylene determined as the main peak at the time of the second temperature elevation, the heat of fusion based on these crystal melting peaks (Tp) is at least 50% of the whole heat of fusion, and the sum of heat of fusion of high-temperature side peaks (Tp1) at temperatures in the range of from (Tm+35)° C. to (Tm+120)° C. is at least 5% of the whole heat of fusion.

3. A fiber-reinforced polymer molded body as set forth in claim 1, wherein the molecularly oriented and silane-crosslinked ultra-high-molecular-weight polyethylene fiber is a fiber obtained by grafting polyethylene having an intrinsic viscosity ($\eta$) of at least 5 dl/g as measured in decalin as the solvent at 135° C. with a silane, spinning the silane-grafted polyethylene, drawing the spun polyethylene and crosslinking the grafted silane, and the amount of the grafted silane expressed as % by weight of Si is 0.01 to 5% by weight and the orientation degree (F) of the fiber is at least 0.90.

4. A fiber-reinforced polymer molded body as set forth in claim 1, wherein the molecularly oriented and silane-crosslinked ultra-high-molecular-weight polyethylene fiber is a fiber obtained by grafting polyethylene having an intrinsic viscosity ($\eta$) of at least 5 dl/g as measured in decalin at 135° C., which contains a diluent, with a silane compound in the presence of a radical initiator, spinning and drawing the grafted polyethylene, and crosslinking the grafted silane compound.

5. A fiber-reinforced polymer molded body as set forth in claim 1, wherein the molecularly oriented and silane-crosslinked ultra-high-molecular-weight polyethylene fiber has an elastic modulus of at least 20 GPa and a tensile strength of at least 1.2 GPa.

6. A fiber-reinforced polymer molded body as set forth in claim 1, wherein the reinforcing layer is laminated or embedded over the entire surface of the molded body and the reinforcing layer is composed of a filament of molecularly oriented and silane-crosslinked ultra-high-molecular-weight polyethylene directed in at least one axial direction of the molded body or a non-woven fabric, woven fabric or knitted fabric composed of said filament.

7. A fiber-reinforced polymer molded body as set forth in claim 1, wherein the reinforcing fiber layer is present in an amount of 20 to 80% by volume based on the total molded body.

8. A fiber-reinforced polymer molded body as set forth in claim 1, wherein the matrix polymer is a thermoplastic resin having a melting point or softening point lower than 220° C.

9. A fiber-reinforced polymer molded body as set forth in claim 8, wherein the matrix polymer is an olefin resin.

10. A fiber-reinforced polymer molded body as set forth in claim 1, wherein the matrix polymer is a thermosetting resin having a setting temperature lower than 220° C.

11. A fiber-reinforced polymer molded body as set forth in claim 10, wherein the thermosetting resin is an epoxy resin.

12. A fiber-reinforced polymer molded body as set forth in claim 1, wherein the matrix polymer is a rubber having a curing temperature lower than 220° C.

13. A fiber-reinforced polymer molded body which comprises a matrix polymer having a processing temperature lower than 220° C. and at least one reinforcing layer of a molecularly oriented and silane-crosslinked ultra-high-molecular weight polyethylene fiber, wherein (i) said reinforcing layer is laminated with or embedded in the matrix in a state where the ends of said layer are restrained, said matrix being thermally formed or thermally cured, (ii) said fiber contains the grafted silane in an amount of 0.01 to 5% by weight as the content of Si based on the ultra-high-molecular weight polyethylene and has at least two crystal-melting peaks (Tp) at temperature higher by at least 10° C. than the inherent crystal-melting temperature (Tm) of the ultra-high-molecular weight polyethylene obtained as the main melting peak at the second temperature elevation, when the fiber is analyzed in the constrained state by a differential scanning calorimeter, the melting calorific value of the crystal-melting peaks (Tp) being at least 50% of the total melting calorific value and the sum of calorific values of high temperature side melting peaks (Tp1) appearing at temperatures in the range of from (Tm+35° C.) to (Tm+120° C.) being at least 5% of the total melting calorific value, and (iii) the reinforcing layer substantially retains the orientation crystal structure of the ultra-high-molecular weight polyethylene fiber.

* * * * *